United States Patent [19]

Sternberg

[11] 4,168,482

[45] Sep. 18, 1979

[54] COMBINATION ACOUSTIC FILTER PLATE AND LIQUID LENS

[75] Inventor: Robert L. Sternberg, Noank, Conn.

[73] Assignee: The United States of America as represented by the Secretary of the Navy, Washington, D.C.

[21] Appl. No.: 924,461

[22] Filed: Jul. 14, 1978

Related U.S. Application Data

[63] Continuation-in-part of Ser. No. 784,186, Apr. 4, 1977.

[51] Int. Cl.[2] .............................................. H04B 13/00

[52] U.S. Cl. .................................... 367/150; 367/180; 367/155

[58] Field of Search ...................................... 340/8–14; 310/335

[56] References Cited

U.S. PATENT DOCUMENTS

| | | | |
|---|---|---|---|
| 2,300,251 | 10/1942 | Flint | 340/8 L |
| 3,928,839 | 12/1975 | Warner et al. | 340/8 L X |

*Primary Examiner*—Harold J. Tudor
*Attorney, Agent, or Firm*—Richard S. Sciascia; Arthur A. McGill; Prithvi C. Lall

[57] ABSTRACT

A single acoustic filter plate-lens unit for providing directional, frequency independent beam-forming. The unit comprises a liquid container having a curved and radially tapered stainless steel plate on one side and thin metallic shell on the other. An acoustically slow liquid fills the space between the plates. The unit can be used in conjunction with a retina transducer system for conversion of acoustic signals into electrical signals and vice versa.

12 Claims, 2 Drawing Figures

COMBINATION ACOUSTIC FILTER PLATE AND LIQUID LENS

STATEMENT OF GOVERNMENT INTEREST

The invention described herein may be manufactured and used by or for the Government of the United States of America for governmental purposes without the payment of any royalties thereon or therefor.

This application is a continuation-in-part of application Ser. No. 784,186 filed Apr. 4, 1977 for Frequency Independent Acoustic Antenna.

BACKGROUND OF THE INVENTION

The present invention generally relates to acoustic systems and more particularly to underwater sound transmitting or receiving systems having the unique property of having a directional constant beamwidth diffraction pattern over a wide band of frequencies either with or without scanning.

Many prior art devices in the underwater field have addressed themselves to the problem of providing wide band frequency response so that maximum sound pressure level remains uniform over a wide range of frequencies. The above recited prior art, however, has not addressed itself to the problem of maintaining a constant beamwidth diffraction pattern over a wide range of frequencies.

SUMMARY OF THE INVENTION

It is therefore a general object of the present invention to provide an improved acoustic receiving or transmitting mechanism. It is a further object that the acoustic receiving or transmitting mechanism produce a constant beamwidth diffraction pattern over a wide range of frequencies suitable for fixed or scannable directional sound reception or transmission. Another object is that the receiving or transmitting mechanism be suitable for use with underwater sound. Other objects are that the mechanism be suitable for use in oil exploration, ultrasonic medical diagnostics and various other acoustic enterprises. Further objects are that the device be compact, economical, rugged and durable. These and other objects of the invention and the various features and details of construction and operation will become apparent from the specification and drawings.

These several objectives are accomplished in accordance with the present invention by providing an acoustic filter plate functioning as a lens stop for transmitting low frequencies over an effective aperture of a large area and high frequencies over an effective aperture of a small area. For frequencies between the low and high frequency the filter plate will transmit an increasing frequency through an effective aperture of decreasing area. A lens is provided as an integral unitary structure with the acoustic filter plate by affixing a thin metallic shell at the periphery of the acoustic filter plate and filling the space between the metallic shell and the filter plate with an acoustically slow liquid.

DESCRIPTION OF THE PREFERRED EMBODIMENT

Figure 1:
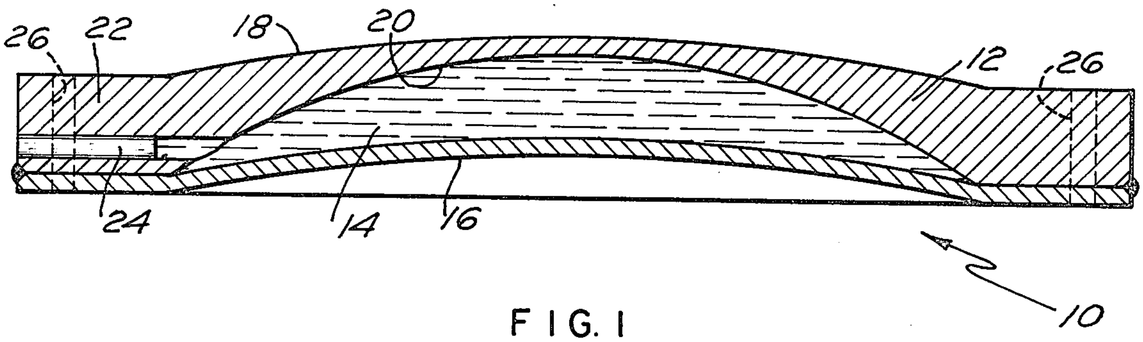
FIG. 1 is a sectional view of a hermetically sealed combination acoustic filter plate and liquid lens in accordance with the present invention.

Referring now to FIG. 1 there is generally shown a combined lens and filter plate, acoustic antenna device 10. It includes a stainless steel filter plate 12, a liquid scannable lens 14 and a stainless steel shell 16.

The filter plate 12 has a front surface 18 and a back surface 20. Both of the surfaces 18, 20 are curved in cross-section and form surfaces of revolution about the central axis of the plate 12. The thickness of the plate increases substantially linearly in proportion of the radial distance from the center to its rim 22. The maximum acoustic frequency transmitted by the filter plate 12, at any point on it, is a function of its thickness. In particular, at the center of the plate, higher frequencies are transmitted than near the rim 22. Each portion of the plate 12 has a cutoff frequency with all frequencies lower than the cutoff frequency being transmitted. Using a stainless steel plate of varying thickness with the thickness increasing from the center outward, wavelengths of sound in the metal of the plate shorter than about twenty times the thickness of any portion of plate 12 will be inhibited from that portion outward from transmitting through the plate. In other words, the thickness of the plate at each point is approximately 1/20 wavelength of the cutoff frequency of the sound in the metal of the plate at that point. All lower frequencies are conducted and all higher frequencies have their transmission inhibited. It is seen that in the present invention low frequencies are transmitted over a large diameter central area of plate 12 and the higher the frequency the smaller the diameter of the conductive central area. Since beamwidth is a constant multiple of the ratio $\lambda/d$, where d is the diameter of the central area of the plate 12 which transmits the sound of wavelength $\lambda$, it can be seen that the square root of the surface area of plate 12 transmitting sound is in direct proportion to the wavelength of the applied signal.

The back surface 20 of the filter plate 12 also serves as the front wall of the liquid scannable lens 14 and together with the shell 16 acts to contain the liquid 14 to the required lens shape. A suitable plug 24 forms a portion of the outer rim 22 of plate 12. This is to enable the pouring of the liquid scannable lens 14 into the lens shaped cavity formed between filter plate 12 and shell 16. The liquid used to form lens 14 is an acoustically slow velocity liquid such as carbon tetrachloride or liquid cesium metal. The shell 16 is thin so as not to inhibit high frequency signals. It is affixed to the filter plate 12 by means of welding or gluing. The volume between these components defines the liquid lens. The plug 24 can be made of stainless steel and is suitable for welding or gluing to the filter plate 12.

Figure 2:
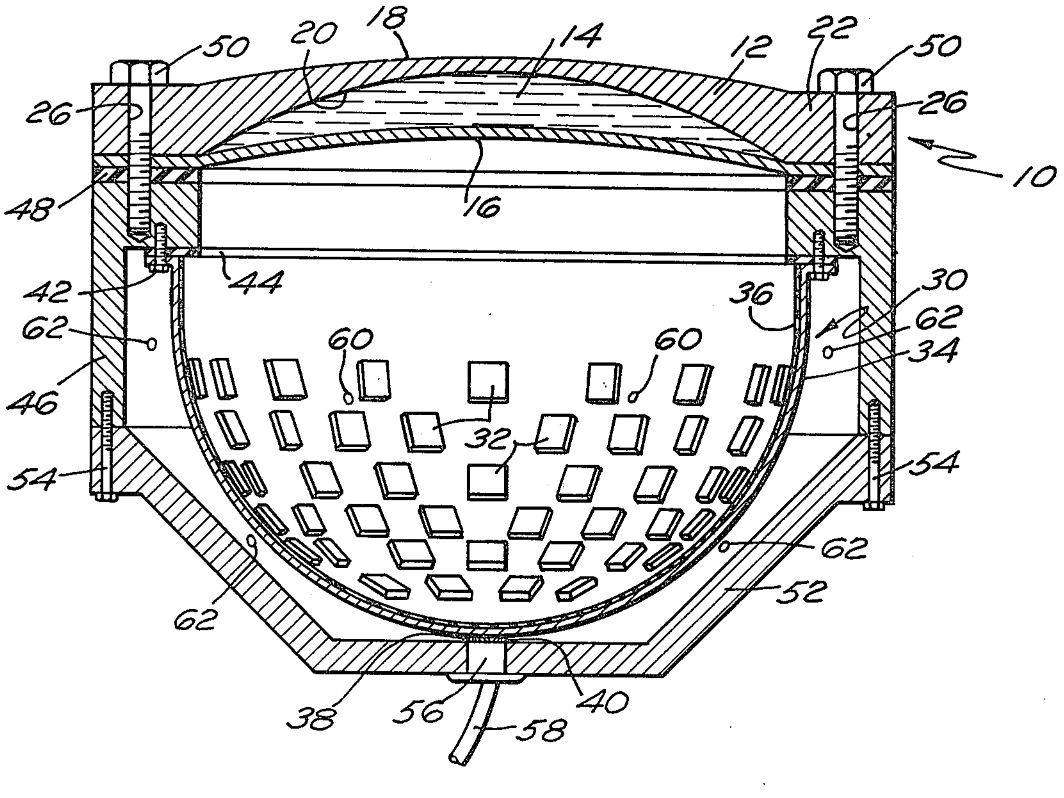
FIG. 2 is a sectional view of the device of FIG. 1 housed in combination with a retina.

Referring now to FIG. 2 there is shown the acoustic antenna device 10 of FIG. 1 for use in combination with a retina 30. The retina 30 comprises individual piezoelectric transducer elements 32, with each element corresponding to a separate beam direction. The elements are mounted on a shell 34 having a layer of acoustic absorber 36. Each element 32 has a plurality of watertight conductors 38 and 40. A plurality of bolts 42 hold the retina 30 in place. A gasket 44 is located between yoke 46 and retina 30. The yoke 46 is connected to rim 22 through a gasket 48 by means of bolts 50. A housing piece 52 is connected to yoke 46 by means of bolts 54. A watertight connector 56 carrying submersible electrical cable 58 passes through housing piece 52. Apertures 62 are located in the sidewalls of yoke 46 and housing piece 52, and apertures 60 are located in the sidewalls of shell 34. Apertures 60 and 62 are for the purpose of admitting water to prevent differential pressures.

In operation as an acoustic receiving or listening device, an acoustic signal exterior to acoustic antenna 10 impinges on filter plate 12. A portion of the filter plate 12 determined by the frequency of the signal and the geometry and material properties of the plate, transmits the acoustic signal to lens 14. The signal is then focussed on retina 30 and more particularly, on the particular retina element 32, corresponding to the direction of arrival of the acoustic signal on the filter plate 12. The retina element 30 converts the acoustic signal to an electrical signal for transmission along conductors 38 and 40.

In operation as an acoustic transmitting device, conductors 38 and 40 carry an electrical signal to a retina element 32. In a known manner the element 32 converts the electrical signal to an acoustic signal. The acoustic signal then impinges on lens 14 and is focussed and formed into a beam by the lens 14 in the direction corresponding to the particular retina element 32. The beam impinges on the filter plate 12 and is transmitted through a portion of plate 12 depending on the frequency of the acoustic signal and the cutoff characteristics of the plate 12 to form a constant beamwidth frequency independent diffraction pattern.

There has therefore been described a uniform beamwidth frequency independent acoustic antenna. The antenna has wide band frequency independent acoustic radiation and receiving properties for unidirectional or multidirectional scannable operation. The filter plate 12 described is of stainless steel but could be made of other metals or of materials of composite structure incorporating provisions for localized phase or aberration correctors. The correctors could be made of polystyrene, plexiglass or other materials in ways obvious to those skilled in the art of acoustic devices. If necessary, a bubble trap can be added to allow for expansion of the liquid that forms lens 14.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. An acoustic device adapted for use in a system comprising:

acoustic means for forming a constant beamwidth frequency independent diffraction pattern on impinging acoustic signals, said acoustic means includes a substantially rigid filter plate made of a high acoustic impedance material having an operable region of variable thickness with the thickness increasing substantially linearly in proportion to the radial distance from the center of said filter plate;

a thin shell connected to said filter plate; and a liquid lens located between said filter plate and said shell.

2. An acoustic device according to claim 1 wherein said filter plate, said shell and said liquid lens form a single unit.

3. An acoustic device according to claim 2 wherein said filter plate is of variable thickness having first and second opposing surfaces, said surfaces are curved in cross-section and form surfaces of revolution about the central axis of said plate.

4. An acoustic device according to claim 2 wherein said filter plate is made of stainless steel, said filter plate has a rim and the thickness of said filter plate increases substantially linearly in proportion to the radial distance from the center of said filter plate to said rim, the thickness of the plate at any given point being substantially one-twentieth of the cutoff wavelength for that point.

5. A scannable acoustic transmitter comprising:

wide band tranducing means for converting electrical signals to acoustic signals over a wide range of frequencies, said transducing means including a retina of separate transducing elements each corresponding to a different transmitting direction;

a liquid lens in signal communication with said transducing means for focusing said acoustic signals into directional scanning transmitting beams projected at various angles to the axis of the transmitter; and acoustic means in signal communication with said transducing means and said liquid lens for aperture stopping said scanning transmitted beams to form beams with frequency independent beamwidth, said acoustic means comprises a substantially rigid filter plate made of a high acoustic impedence material.

6. A scannable acoustic transmitter according to claim 5 wherein said acoustic means further comprises a lens stop having an automatically variable aperture of a size that is an inverse function of frequency.

7. A scannable acoustic transmitter according to claim 5 wherein said acoustic means further comprises said filter plate having transmitting means for transmitting acoustic signals as a function of the thickness of the filter plate in terms of the wavelength of an acoustic signal propagating through said filter plate.

8. A scannable acoustic transmitter according to claim 5 wherein said acoustic means further comprises:

said filter plate of variable thickness having first and second opposing surfaces, said surfaces are curved in cross-section and form surfaces of revolution about the central axis of said plate.

9. A scannable acoustic receiver comprising:

acoustic means for preforming frequency independent constant beamwidth directional scannable beams for receiving acoustic signals, said acoustic means comprises a substantially rigid filter plate made of a high acoustic impedence material;

a liquid lens in signal communication with said acoustic means for focusing said received acoustic signals arriving at various angles to the axis of the receiver; and wide band transducing means in signal communication with said acoustic means and said liquid lens for converting received and focused acoustic signals to electrical signals, said transducing means including a retina of separate transducing elements each corresponding to a different receiving direction.

10. A scannable acoustic receiver according to claim 9 wherein said acoustic means further comprises a lens stop having an automatically variable aperture of a size that is an inverse function of frequency.

11. A scannable acoustic receiver according to claim 9 wherein said acoustic means further comprises said filter plate having transmitting means for transmitting acoustic signals as a function of the thickness of the filter plate in terms of the wavelength of an acoustic signal propagating through the filter plate.

12. A scannable acoustic receiver according to claim 9 wherein said acoustic means further comprises:

said filter plate of variable thickness having first and second opposing surfaces, said surfaces are curved in cross-section and form surfaces of revolution about the central axis of said plate.

* * * * *